United States Patent [19]
Mangan et al.

[11] Patent Number: 5,264,674
[45] Date of Patent: Nov. 23, 1993

[54] APPARATUS AND METHOD FOR FUSING WIRE

[75] Inventors: John P. Mangan, Iselin; Edward D. Riordan, South Somerville, both of N.J.

[73] Assignee: Joyal Products, Inc., Linden, N.J.

[21] Appl. No.: 847,956

[22] Filed: Mar. 6, 1992

[51] Int. Cl.5 ............................................. B23K 11/16
[52] U.S. Cl. ................................................. 219/56.22
[58] Field of Search ............... 219/56.22, 56, 56.1, 219/56.21, 78.01, 85.16, 85.18, 233, 235

[56] References Cited

U.S. PATENT DOCUMENTS

| | | | |
|---|---|---|---|
| 1,813,161 | 7/1931 | Helle | 219/233 |
| 2,359,393 | 10/1944 | Sloan | 219/233 |
| 2,491,931 | 12/1949 | Raker et al. | 219/233 |
| 2,541,214 | 2/1951 | Davis | 219/235 |
| 4,396,819 | 8/1983 | Muchkin et al. | 219/56 |
| 4,543,462 | 9/1985 | Rossell | 219/56.22 |
| 4,910,383 | 3/1990 | Zimmer | 219/233 |
| 5,111,015 | 5/1992 | Riordan | 219/56.22 |

FOREIGN PATENT DOCUMENTS

| | | | |
|---|---|---|---|
| 3017448 | 11/1981 | Fed. Rep. of Germany | 219/233 |
| 125122 | 6/1949 | Sweden | 219/235 |

Primary Examiner—Geoffrey S. Evans
Attorney, Agent, or Firm—Lerner, David, Littenberg, Krumholz & Mentlik

[57] ABSTRACT

A fusing apparatus and method is described for forming a fuse joint between an armature wire having electrical insulation thereon and a terminal extending from a commutator bar. The apparatus includes a U-shaped fusing electrode including a central portion having an effective electrical resistance higher than the remaining portions of the electrode. By applying current through the electrode, the central portion is heated to a temperature higher than the remaining portions of the electrode sufficient to remove the electrical insulation from the armature wire and to fuse the armature wire to the terminal.

29 Claims, 3 Drawing Sheets

APPARATUS AND METHOD FOR FUSING WIRE

BACKGROUND OF THE INVENTION

The present invention relates in general to an improved fusing apparatus and method, and more particularly, to a single electrode fusing apparatus and method for fusing armature wires having an electrically insulating coating, e.g., magnet wire, to the tangs of a commutator.

Fusing is a known technique for joining electrically-conductive elements in which a fusing electrode is contacted with one element adjacent the joint so that the fusing electrode forces the elements together. A ground electrode is also contacted with one of the elements, typically at a location remote from the joint, such that an electrical current is passed through the electrodes and at least one of the elements. Heat generated by the electrical current, and the high pressure applied by the fusing electrode, causes a bond to form between the elements. The fusing electrode typically has higher resistivity than the ground electrode, and ordinarily has a small contact surface region bearing on the element. Thus, the major portion of the heat used in the process ordinarily is produced in the fusing electrode itself. Fusing techniques, also referred to as "hot staking" are used in a variety of industrial applications. For example, the armature windings and commutator bars of dynamoelectric machines are typically joined to one another by fusing in mass production.

Apparatus and methods for mass production of fusing armature windings and commutator bars have been developing for many years. Initially, soft soldering or brazing was employed to join the armature wires to the commutators. However, the need for high quality motors which are reliable and economical has resulted in the growth in increased utilization of commutator fusing techniques. In addition, in order to further improve production methods, tang-type commutators were developed, as compared to the prior slotted-type commutators, which made it simpler for attaching the armature lead wires to the commutator bars by means of an extending tang. An example of such an apparatus and method which discloses efficient and rapid fusing of both the tang-type and slotted-type of commutators, is shown in Riordan et al., U.S. Pat. No. 4,224,496.

There is also known from Abe, U.S. Pat. No. 4,835,356, a three electrode spot welding apparatus designed for fusing magnet wire. The apparatus includes three electrodes, the first two of which are opposed to one another whereby a workpiece, including, for example, a magnet wire and a terminal pin to be welded together, is subjected to electric resistance welding in such a manner that the workpiece is held between the first and second electrodes. The third electrode is interposed between the first electrode and the workpiece so that one distal end face of the third electrode abuts against a workpiece engaging end of the first electrode and that the other distal end face of the third electrode is in contact with the workpiece. The proximal end of the first electrode is connected to a first terminal of a power source and the respective proximal ends of the second and third electrodes are connected to a second terminal.

The power source supplies a current to heat the third electrode and remove the plastic electrical insulation by vaporization by closing a circuit having a path through the first terminal, the first electrode, the third electrode and the second terminal during a predetermined period. After removal of the electrical insulation, the power supply supplies a current to weld the magnet wire to the workpiece by closing a circuit having a path through the first terminal, the first electrode, the third electrode, the workpiece, the second electrode and the second terminal. Although the disclosed fusing apparatus is useful in fusing magnet wire in certain applications, it is not suitable for fusing magnet wire to the tangs extending from a commutator bar as there is no access for the second electrode to the tangs.

Referring to FIG. 1 of the present case, there is shown a portion of a commutator bar 100 of a tang-type commutator as known from Riordan et al. An elongated tang 102 extends in a U-shaped configuration from the end surface of the commutator bar 100. An armature wire 104 having an electrically insulating coating, e.g., magnet wire, extends through the opening 106 of the tang 102 for fusing purposes. A fusing electrode 108 is placed on the tang 102 and a ground electrode 110 is placed on the surface of the commutator bar 100 at a remote location.

There is also shown schematically the connection between electrodes 108, 110 to a transformer 112 for controlling the current supply to the electrodes. The fusing electrode 108 is formed from a high resistance alloy such as tungsten, while the ground electrode 110 is formed from a low resistant alloy such as copper. A current path is formed between the fusing and ground electrodes 108, 110 which has a path through tang 102 and commutator bar 100. As a result of the high resistance of the fusing electrode 108, the tang 102 is heated to vaporize the electrically insulating coating on the armature wire 104 to enable subsequent fusing of the armature wire to the tang.

Although this method has enjoyed commercial success, there are a number of shortcomings and disadvantages which are desirable to overcome. For example, if the area of the brush track along the commutator bar 100 is thin, the brush track has the tendency to become annealed as a result of the application of high current between the fusing and ground electrodes 108, 110. This annealing of the commutator bar 100 within the brush track results in the material, typically copper, to become softer than normal. Subsequent to the fusing process, the surface of the commutator bars 100 are provided with a smooth surface finish and a uniform radius of curvature in what is commonly referred to as a turning process. In the event the copper material of the commutator bars 100 has become annealed, the material within the brush track of the commutator bars will have the tendency in turning to smear into and bridging the grooves formed between adjacent commutator bars resulting in the creation of electrically short circuits. This will necessitate reworking to clear the grooves to provide electrical isolation between adjacent commutator bars 100. In addition, the running of the brushes on softer material also results in greater wear to the brush track of the commutator bars 100, as well as potentially causing additional smearing of the copper material and the resulting electrical shorting.

The aforementioned fusing process although having demonstrated utility, cannot be used in the manufacture of certain commutators designed for special applications. For example, there is known an armature for use in a combustion engine fuel pump using a gasoline alcohol mixture which provides the commutator bars in the shape of individual wedges arranged in a circle within a common plane. Due to the corrosive effects of the alcohol, a corresponding wedge-shaped block of carbon material is bonded to the face of each commutator bar to provide the brush track. Although these commutators are of the tang-type, there is no suitable location for placement of the ground electrode on the commutator bars to permit use of the aforementioned fusing process as they have been covered with a block of carbon material.

Referring to FIG. 2, there is schematically shown a fusing apparatus having a pair of spaced electrodes for fusing an armature wire to the tang of a tang-type commutator which overcomes the aforementioned problems and disadvantages, and which is the subject matter of a pending application assigned to same assignee of the present application. The fusing and ground electrodes 108, 110 disclosed are arranged engaging the tang 102 in fixed spaced apart, side-by-side relationship to enable the formation of a current path between the electrodes and through a portion of the tang overlying or adjacent the armature wire 104. The current path for illustration purposes is shown by dashed lines 114. The spacing between the fusing and ground electrodes 108, 110 is such to enable the electrodes to simultaneously contact the common upper surface of the tang 102 in the manner as shown, thereby avoiding the necessity of having to engage the brush track with the ground electrode and the disadvantages resulting therefrom as previously mentioned.

It is preferred to keep the current path 114 through the tang 102 relatively short as this portion of the tang can act as a fuse link between the fusing and ground electrode 108, 110. However, the space between the fusing and ground electrodes 108, 110 results in the formation of a wedge of material from the tang 102 being extruded upwardly therebetween as the electrodes compress downwardly on the tang. The wedge has been known to interfere with the further assembly of the armature within its housing in certain applications. In addition, repeatedly contacting the tang 102 with the fusing and ground electrodes 108, 110 can cause arcing which can result in the splattering of copper from the tang onto the electrode faces thereby reducing their working life. Thus, there have been substantial unmet needs for still further improvements in an apparatus and method for fusing armature wires to tang-type commutators.

SUMMARY OF THE INVENTION

It is therefore broadly one object of the present invention to provide an apparatus and method of fusing a wire having electrical insulation thereon to a terminal tang using a heat generating fusing electrode without the application of current through the terminal tang itself to effect its direct heating as known from the prior art.

In one embodiment of the present invention there is disclosed a fusing apparatus for forming a fused joint between a wire having electrical insulation thereon and a terminal, the apparatus comprising a fusing electrode constructed from a material having a high electrical resistance, a portion of the electrode constructed to have an electrical resistance higher than the electrical resistance of the remainder of the electrode, moving means for moving at least the portion of the electrode having a higher electrical resistance against one surface of the terminal proximately overlying a portion of the wire, and means for supplying electrical current through the electrode to heat the portion having a higher electrical resistance to a temperature higher than the remaining portions of the electrode and sufficient to remove the electrical insulation from the wire in contact with the terminal and to fuse the wire thereto.

In another embodiment of the present invention there is disclosed a fusing apparatus for forming a fused joint between an armature wire having electrical insulation thereon and a terminal extending from a commutator bar, the apparatus comprising a heat generating fusing electrode constructed from a single material having a high electrical resistance, the electrode including a U-shaped member having a pair of spaced leg portions integrally joined at one end thereof by a third leg portion, the third leg portion constructed to have an effective electrical resistance higher than the electrical resistance of the pair of spaced leg portions, moving means for moving the electrode for engaging at least the third leg portion against one surface of the terminal proximately overlying a portion of the armature wire, support means for removably supporting the electrode by the moving means, and means for supplying electrical current through the pair of spaced leg portions and the third leg portion to heat the third leg portion to a temperature higher than the pair of spaced leg portions and sufficient to remove the electrical insulation from the wire in contact with the terminal and to fuse the wire thereto.

In another embodiment of the present invention there is disclosed a method for forming a fused joint between a wire having electrical insulation thereon and a terminal, the method comprising moving a fusing electrode constructed from a material having a high electrical resistance against the terminal proximately overlying a portion of the armature wire, the electrode having a portion engaging the terminal constructed to have an electrical resistance higher than the electrical resistance of the remainder of the electrode, and supplying electrical current through the electrode to heat the portion having a higher electrical resistance to a temperature greater than the remaining portions of the electrode and sufficient to remove the electrical insulation from the armature wire in contact with the terminal and to fuse the armature wire thereto.

In another embodiment of the present invention there is disclosed a fusing method for forming a fused joint between an armature wire having electrical insulation thereon positioned against one surface of a terminal extending from a commutator bar, the method comprising moving a heat generating fusing electrode constructed from a material having a high electrical resistance against another surface of the terminal proximately overlying a portion of the armature wire, the electrode including a U-shaped member having a pair of spaced leg portions integrally joined at one end thereof by a third leg portion, the third leg portion constructed to have an electrical resistance higher than the electrical resistance of the pair of spaced leg portions, and supplying electrical current through the pair of spaced leg portions and the third leg portion to heat the third leg portion to a temperature higher than the pair of spaced leg portions sufficient to remove the electrical insulation from the armature wire in contact with the terminal and to fuse the armature wire thereto.

In another embodiment of the present invention there is disclosed a fusing apparatus for forming a fused joint between an armature wire having electrical insulation thereon and a terminal extending from a commutator bar, the apparatus comprising a fusing electrode constructed from a material having a high electrical resistance, moving means for moving the electrode against one surface of the terminal proximately overlying a portion of the wire, and means for supplying electrical current solely through the electrode to heat the electrode to a temperature sufficient to remove the electrical insulation from the wire in contact with the terminal and to fuse the wire thereto.

In another embodiment of the present invention there is disclosed a method for forming a fused joint between an armature wire having electrical insulation thereon positioned against one surface of a terminal extending from a commutator bar, the method comprising moving a fusing electrode constructed from a material having a high electrical resistance against the terminal proximately overlying a portion of the wire, and supplying electrical current solely through the electrode to heat the electrode to a temperature sufficient to remove the electrical insulation from the wire in contact with the terminal and to fuse the wire thereto.

BRIEF DESCRIPTION OF THE DRAWINGS

Preferred embodiments of the present invention will be described in greater detail with reference to the accompanying drawings, wherein like members bear like reference numerals and wherein.

DETAILED DESCRIPTION OF THE PREFERRED EMBODIMENTS

As thus far described, the present invention is particularly useful in fusing an armature wire, e.g., magnet wire, to the tang of a tang-type commutator, as well as terminal tangs in general such as those on coils and the like. By way of background, an armature is one of the two essential parts of an dynamoelectric machine. In, for example, a generator, the armature is the winding in which electromotive force (emf) is produced by magnetic induction. In a motor armature, conductors carry the input current which, in the presence of a magnetic field, produces a torque and affects the conversion of electrical into mechanical energy. In dc machines it is the rotor, but the ac armature may be a rotor or stator. Large size synchronous machines always have stationary armatures. The reluctance of the magnetic circuit to the flux which the conductors of the armature must cut in order to generate electric energy, is decreased by providing a core of soft iron or steel, on the surface of which the conductors are embedded in slots suitably provided in the core. The armature windings of a dc generator are terminated at the segments of a commutator, by means of which the alternating emf's induced in the armature are rectified and transferred by brushes from the moving rotor to stationary terminals. The conductors must be separately insulated, as must be also the commutator segments, and must be well fused and anchored in their slots to resist the electromagnetic and mechanical forces which tend to displace them, hence the need for the apparatus and method of the present invention.

Although the present invention has been described as having particular utility in connection with the fusing of armature wires to a tang-type commutator, it is to be understood that other elements in connection with other assemblies may be fused together pursuant to the present invention. For example, electronic components such as resistors, capacitors and the like may have their leads fused directly to tangs provided on mechanical assemblies, as well as print circuit boards, as desired pursuant to the apparatus and method of the present invention.

Figure 1:
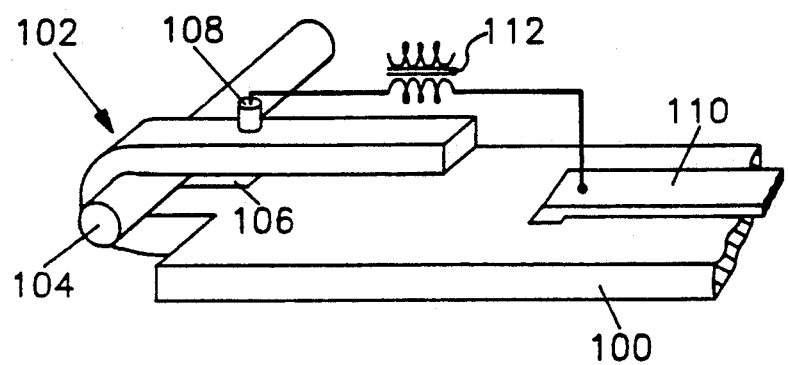
FIG. 1 is a diagrammatic perspective view of fusing an armature wire to a tang-type commutator in accordance with the prior art.
Figure 2:
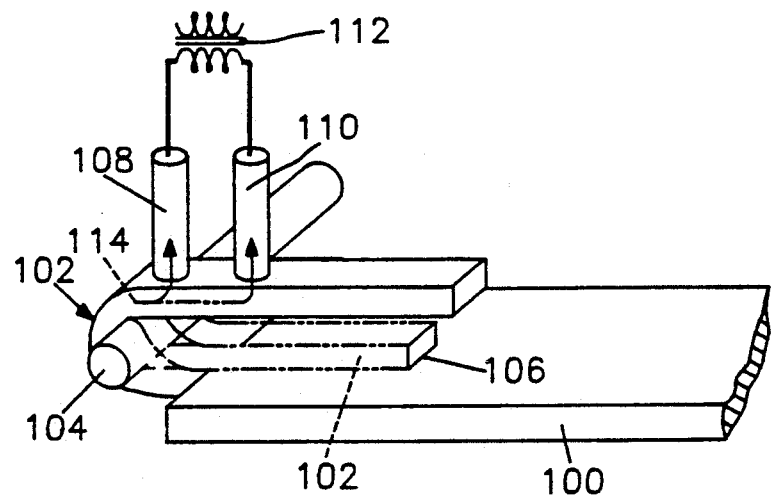
FIG. 2 is a diagrammatic perspective view of fusing an armature wire to a tang-type commutator also in accordance with the prior art.
Figure 3:
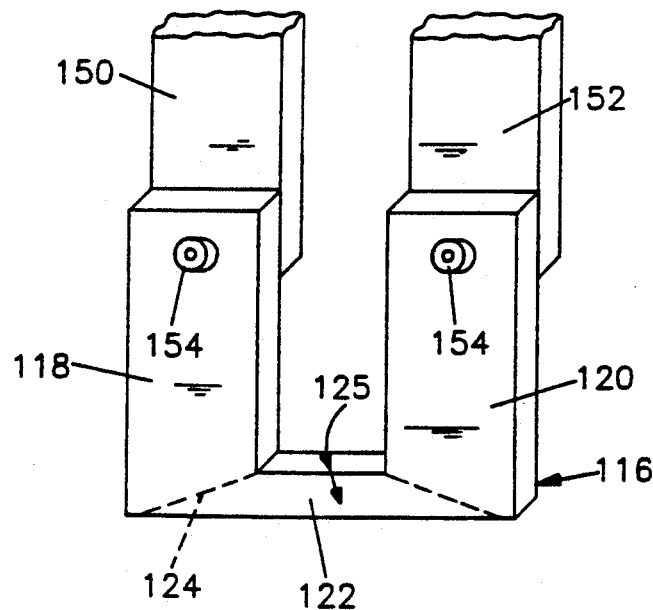
FIG. 3 is a front elevational view of a heat generating fusing electrode constructed in accordance with one embodiment of the present invention.

Referring now to FIG. 3, there is schematically shown a heat generating fusing electrode 116 in accordance with one embodiment of the present invention. The electrode 116 is constructed as a flat U-shaped member having first and second spaced leg portions 118, 120 integrally connected across one end by a third leg portion 122. The electrode 116 can be integrally constructed from a variety of materials having a high electrical resistance, such as Tungsten, Elkonite, which is a copper-tungsten alloy, and the like. It is the primary function of the electrode 116 to internally generate heat to sufficiently heat the tang 102 sufficiently to vaporize the electrical insulation from the armature wire 104.

In accordance with the present invention, the electrode 116 is constructed to enable localization of its heating to a selected portion for greater efficiency and to increase the useful life of the electrode. To this end, the third leg portion 122 is constructed to have an effective electrical resistance greater than that of the first and second leg portions 118, 120. This is accomplished by constructing the third leg portion 122 to have, for example, a smaller cross-sectional area such as generally at location 125 than that of the first and second leg portions 118, 120. As a consequence, upon application of current between the first and second leg portions 118, 120, the third leg portion 122 in the region bounded by the dashed lines 124 will attain a substantially higher temperature than the remainder of the electrode 116 This is visibly noticeable during use of the electrode 116 in that the electrode 116 bound by the dashed lines 124 will glow to a cherry red color.

Figure 4:
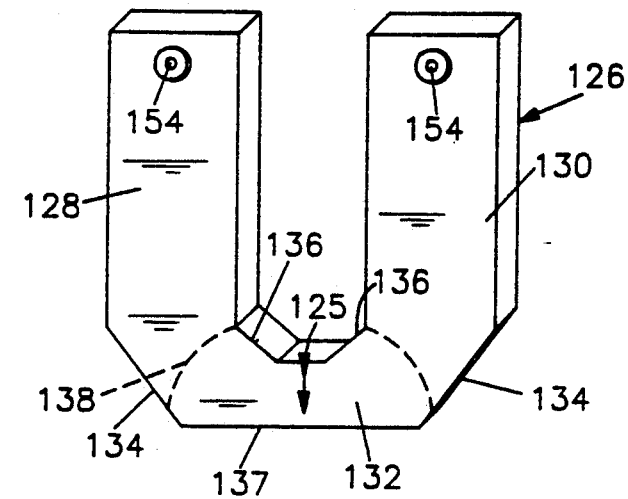
FIG. 4 is a front elevational view of a heat generating fusing electrode constructed in accordance with another embodiment of the present invention.

Referring now to FIG. 4, there is disclosed another embodiment of an electrode 126 constructed in accordance with the present invention. The electrode 126 is similarly constructed as a flat U-shaped member from spaced first and second leg portions 128, 130 and an integrally connecting third leg portion 132 having a smaller cross-sectional area designated at location 125.

The third leg portion 132 has tapered spaced outer end walls 134 and tapered inward walls 136 which function to provide a smaller surface area 137 for contacting the tang 102. More specifically, the outer end walls 134 are arranged at an angle, e.g., less than about 45°, to the longitudinal axis of the electrode 126. When the electrode 126 is brought down into compression contact with the tang 102, the angled end wall 134 reduces the extent of interaction with the armature wire 104 to prevent its being crushed or flattened during the fusing operation. In addition, with the shape of the third leg portion 132 functions to concentrate the heat being generated therein over a smaller region as bound by the dashed lines 138.

Figure 5:
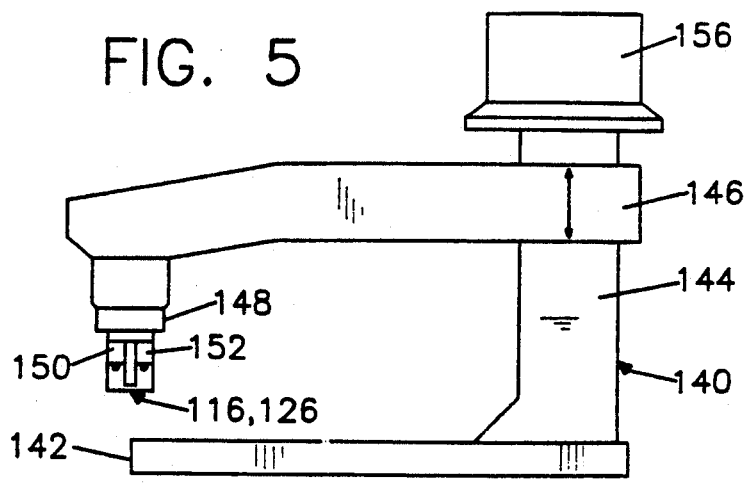
FIG. 5 is a diagrammatic front elevational view of a fusing apparatus shown in conjunction with an electrode employed in the method of the present invention.

Referring now to FIG. 5, there is schematically shown a fusing apparatus 140 for fusing an armature wire to the tang of a tang-type commutator in accordance with one embodiment of the present invention. The apparatus 140 includes a horizontal workpiece support 142 and a vertical mounting post 144. An electrode mounting arm 146 is coupled to the mounting post 144 to permit reciprocal vertical movement thereof as indicated by the double headed arrow. Alternatively, the mounting arm 146 may be coupled to the mounting post 144 to permit pivotal movement therebetween. An electrode mounting head 148 is attached to the free end of the mounting arm 146 and supports a pair of electrode supports 150, 152. The electrode supports 150, 152 are individually spring loaded or each separately coupled to a fluid piston (not shown) within the common mounting head 148.

As shown in FIG. 3, the electrode 116 is attached to the supports 150, 152 by means of screws 154 or the like. In this regard, the supports 150, 152 are constructed and arranged as spaced apart flat rectangular members which respectively support in engage overlapping relationship the ends of the first and second leg portions 118, 120. The electrode 116 may be readily replaced by removal of screws 154 when and as desired. In addition to supporting the electrode 116, the supports 150, 152 allow for the application of welding current through the electrode during the fusing process. To this end, the supports 150, 152 are preferably constructed from low electrical resistance materials such as copper and the like.

The primary function of the fusing apparatus 140 is to bring the free end of the fusing electrode 116 into compression contact with the tang 102 of the tang-type commutator and may accordingly take a variety of construction forms. To this end, the fusing apparatus 140 has been provided with the reciprocal or pivotable mounting arm 146 to which the heat generating electrode 116 has been removably secured to the supports 150, 152.

A welding control unit 156 may take any conventional form of welding control capable of selectively applying welding current to the electrode 116 via the supports 150, 152. The welding control unit 156 may function using what is referred to as "pulsation" and "up-slope" techniques A suitable welding control unit 156, by way of example, may take the form of a Joyal Model 85MU welding control unit available from Joyal Products, Inc. of Linden, N.J.

There are a number of control parameters in the heating process using the welding control unit 156 which may be set by trial and error. For example, a sequence timer within the welding control unit 156 controls the length of time the electrode mounting head 148 is down to engage the tang 102 by the electrode 116. The sequence timer is set so that the electrode mounting head 148 stays down for the duration of the welding process.

The welding control unit 156 can also vary the rate and time of welding. For example, the welding unit control 156 includes a number of related settings, which may also be set by trial and error as follows:

Weld Count—Time in cycles when full top current is applied. When using a thermal monitor as to be described, this switch is taken out of the circuit by means of a dip switch inside the welding control unit 156.

Up-Slope Count—Time in cycles when current is gradually climbing from slope bottom current to top current.

Slope Bottom Current—Percent of current where heat begins.

Top Current—Percent of current where heat ends. This setting is changed to adjust the rate of heating.

A thermal monitor (not shown) is preferably used to control heating and the length of time the tang 102 stays at the set temperature, as opposed to the temperature of the electrode 116. This is achieved by focusing a fiber optic probe at the tang 102. The temperature setting on the thermal monitor is set for the heat desired. One such thermal monitor and its method of use is further disclosed in U.S. Pat. No. 4,224,496.

Figure 6:
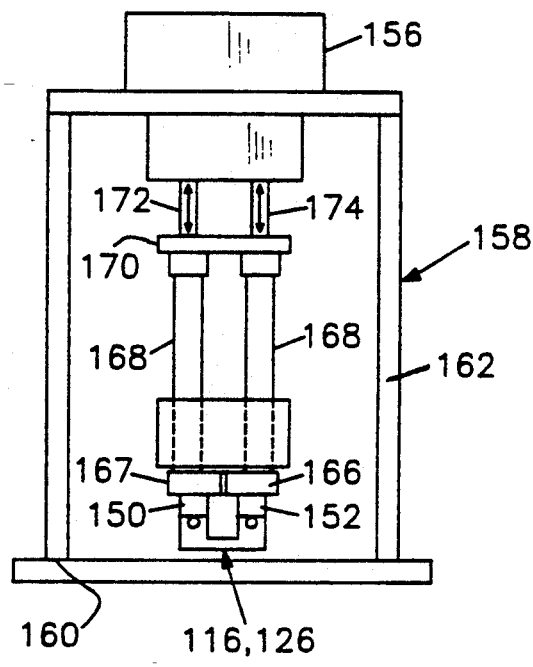
FIG. 6 is a diagrammatic front elevational view of a fusing apparatus in accordance with another embodiment shown in conjunction with an electrode employed in the method of the present invention.

It is to be understood that the fusing apparatus 140 may be constructed to include additional components, as well as being arranged in different cooperative association, to provide the requisite fusing process in accordance with the present invention. For example, as shown in FIG. 6, the welding control apparatus 158 includes a workpiece support 160 and an upstanding frame 162. The electrode 116 is removably mounted to the electrode supports 150, 152, which in turn, and coupled Via electrode mounting heads 164, 166 to the free ends of spring loaded elongated rods 168. The rods 168 are arranged in parallel spaced apart relationship and commonly supported by an alignment assembly 170. The rods 168 are connected at their free end to a fluid actuated piston 172, 174 for concurrent reciprocal vertical movement by means of the respective pistons or the like as indicated by the double headed arrow. In regard, the pistons 172, 174 will act simultaneously to drive the electrode 116 under a compressive force to be exerted against the tang 102.

Figure 7:
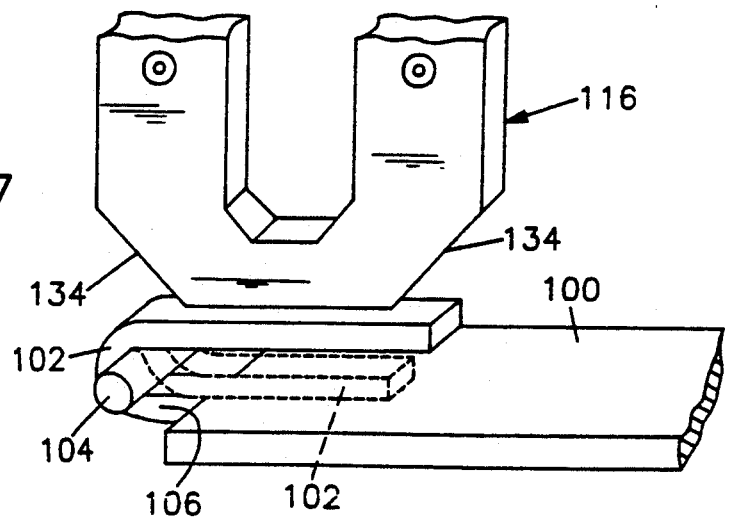
FIG. 7 is a diagrammatic perspective view of fusing an armature wire to a tang-type commutator in accordance with the apparatus and method of the present invention.

The fusing of an armature wire 104 to the tang 102 will now be described with respect to FIG. 7. One or more armature wires 104 are positioned extending through the opening 106 of the U-shaped tang 102 The single heat generating fusing electrode 126 is brought down via mounting arm 146 or pistons 172, 174 under control of the welding control unit 156 into contact with tang 102. The electrode 126 is concurrent heated under control of the welding control unit 156 by application of current from one side of the transformer 112. The third leg portion 122 of the electrode 116 is heated during application of current to an elevated temperature, as generally opposed to the first and second leg portions 118, 120, as a result of the high electrical resistance of the third leg portion via its dimensional construction. In this regard, although the first and second leg portions 118, 120 are heated during the passage of current, they are not heated to a sufficient temperature to perform the fusing operation. The third leg portion 122 of the electrode 126 heats the underlying and immediately adjacent portions of the tang 102 sufficiently to vaporize the electrical insulation from the armature wire 104 without the passage of current through the tang as in the prior fusing apparatus.

Once the electrical insulation has been removed, fusing apparatus 140, under control of the welding control unit 156, is once again operated to cause the electrode 126 to apply a compressive forces to the tang 102 to fuse the armature wire 104 (under heat and pressure) to the tang, as the tang is deformed into the shape shown by the dashed lines and into contact with the commutator bar 100.

As previously described, the electrodes 116, 126 apply a compressive force to the tang 102 to fuse the armature wire 104 (under heat and pressure) to the tang, as the tang is deformed into the shape shown by the dashed lines and into contact with the surface of the commutator bar 100. As a result of the heat and compressive force applied by the electrodes 116, 126, there is, in effect, a hot stack achieved between the tang 102 and armature wire 104 to prevent the formation of gaps which might cause arcing to occur. The heating of the tang 102 has the additional benefit of removing the inherent memory from the tang 102 to provide a stronger bond by reducing the stresses that would otherwise be present if the tang had the tendency to assume its original shape due to its memory.

Figure 8:
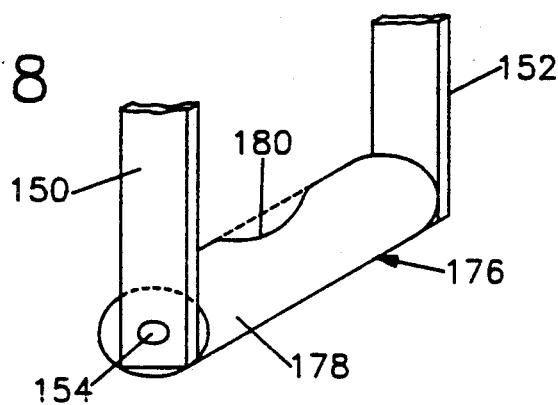
FIG. 8 is a perspective view of a heat generating fusing electrode constructed in accordance with another embodiment of the present invention.

Referring now to FIG. 8, there is shown another embodiment of a heat generating fusing electrode 176 in accordance with the present invention. The electrode 176 is constructed of a cylindrical rod 178 of high electrical resistance material. In the preferred form shown, the rod 178 has a depression 180 or other means which reduces the cross-sectional area to increase the electrical resistance thereat. However, a short rod 178 of uniform diameter as indicated by the dashed lines is also contemplated. The ends of the rod 178 are attached to the supports 150, 152 in the manner as previously described.

The principles, preferred embodiments, and modes of operation of the present invention have been described in the foregoing specification. The invention which is intended to be protected herein, however, is not to be construed as limited to the particular embodiments disclosed, since these are to be regarded illustrative rather than restrictive. Variations and changes may be made by others without departing from the spirit and scope of the invention.

What is claimed is:

1. A single electrode fusing apparatus for forming a fused joint between a wire having electrical insulation thereon and a terminal, said apparatus comprising a single fusing electrode constructed from a material having a high electrical resistance, a portion of said electrode constructed to have an electrical resistance higher than the electrical resistance of the remainder of said electrode, moving means for moving at least said portion of said electrode having a higher electrical resistance against one surface of said terminal proximately overlying a portion of said wire, and means for supplying electrical current solely through said electrode to heat said portion having a higher electrical resistance to a temperature higher than the remaining portions of said electrode and sufficient to remove said electrical insulation from said wire in contact with said terminal and to fuse said wire thereto without the passage of said electrical current through said terminal.

2. The fusing apparatus of claim wherein said electrode comprises a U-shaped member having a pair of spaced leg portions integrally joined at one end thereof by a third leg portion.

3. The fusing apparatus of claim 2, wherein said third leg portion is constructed to have said higher electrical resistance than said pair of spaced leg portions.

4. The fusing apparatus of claim 1, wherein said electrode is constructed from materials selected from the group consisting of tungsten and tungsten alloys.

5. The fusing apparatus of claim 1, wherein said electrode is removably attached to said moving means by a pair of spaced supports constructed of material having a low electrical resistance compared with said electrode.

6. The fusing apparatus of claim 5, wherein said supports are constructed from copper material.

7. The fusing apparatus of claim 1, wherein said portion of said electrode having a higher electrical resistance has a cross-sectional area smaller than the cross-sectional area of the remaining portions of said electrode.

8. The fusing apparatus of claim 1, wherein said moving means applies a compressive force against said terminal by said electrode.

9. A single electrode fusing apparatus for forming a fused joint between an armature wire having electrical insulation thereon and a terminal extending from a commutator bar, said apparatus comprising a single heat generating fusing electrode constructed from a single material having a high electrical resistance, said electrode including a U-shaped member having a pair of spaced leg portions integrally joined at one end thereof by a third leg portion, said third leg portion constructed to have an effective electrical resistance higher than the electrical resistance of said pair of spaced leg portions, moving means for moving said electrode for engaging at least said third leg portion against one surface of said terminal proximately overlying a portion of said armature wire, support means for removably supporting said electrode by said moving means, and means for supplying electrical current solely through said pair of spaced leg portions and said third leg portion to heat said third leg portion to a temperature higher than said pair of spaced leg portions and sufficient to remove said electrical insulation from said armature wire in contact with said terminal and to fuse said armature wire thereto without the passage of said electrical current through said terminal.

10. The apparatus of claim 9, wherein said electrode is constructed from materials selected from the group consisting of tungsten and tungsten alloys.

11. The apparatus of claim 9, wherein said support means comprise a pair of spaced copper supports removably attached to a respective one of said pair of spaced leg portions.

12. The apparatus of claim 9, wherein said third leg portion has a cross-sectional area smaller than the cross-sectional area of said pair of spaced leg portions.

13. The apparatus of claim 9, wherein said electrode has tapered end walls adjacent said third leg portion.

14. A method for forming a fused joint between a wire having electrical insulation thereon and a terminal, said method comprising moving a single fusing electrode constructed from a material having a high electrical resistance against said terminal proximately overlying a portion of said wire, said electrode having a portion engaging said terminal constructed to have an electrical resistance higher than the electrical resistance of the remainder of said electrode, and supplying electrical current solely through said electrode to heat said portion having a higher electrical resistance to a temperature greater than the remaining portions of said electrode and sufficient to remove said electrical insulation from said wire in contact with said terminal and to fuse said wire thereto without the passage of said electrical current through said terminal.

15. The method of claim 14, further including supporting said electrode from a pair of spaced supports having an electrical resistance lower than said electrode.

16. The method of claim 14, further including applying a compressive force against said terminal by said electrode.

17. A single electrode fusing method for forming a fused joint between an armature wire having electrical insulation thereon positioned against one surface of a terminal extending from a commutator bar, said method comprising moving a single heat generating fusing electrode constructed from a material having a high electrical resistance against another surface of said terminal proximately overlying a portion of said armature wire, said electrode including a U-shaped member having a pair of spaced leg portions integrally joined at one end thereof by a third leg portion, said third leg portion constructed to have an electrical resistance higher than the electrical resistance of said pair of spaced leg portions, and supplying electrical current solely through said pair of spaced leg portions and said third leg portion to heat said third leg portion to a temperature higher than said pair of spaced leg portions sufficient to remove said electrical insulation from said armature wire in contact with said terminal and to fuse said armature wire thereto without the passage of said electrical current through said terminal.

18. The method of claim 17, wherein said third leg portion is moved into engagement with said another surface of said terminal.

19. The method of claim 17, further including constructing said third leg portion to have a cross-sectional area smaller than the cross-sectional area of said pair of spaced leg portions.

20. A fusing apparatus for forming a fused joint between an armature wire having electrical insulation thereon and a terminal extending from a commutator bar, said apparatus comprising a single fusing electrode constructed from a material having a high electrical resistance, moving means for moving said electrode against one surface of said terminal proximately overlying a portion of said wire, and means for supplying electrical current solely through said electrode to heat said electrode to a temperature sufficient to remove said electrical insulation from said wire in contact with said terminal and to fuse said wire thereto without the passage of said electrical current through said terminal.

21. The fusing apparatus of claim 20, wherein a portion of said electrode is constructed to have an electrical resistance higher than the electrical resistance of the remainder of said electrode.

22. The fusing apparatus of claim 21, wherein said portion of said electrode having a higher electrical resistance has a cross-sectional area smaller than the cross-sectional area of the remaining portions of said electrode.

23. The fusing apparatus of claim 20, wherein said electrode comprises a cylindrical rod.

24. The fusing apparatus of claim 23, wherein said rod is removably attached to said moving means by a pair of space supports constructed of material having a low electrical resistance compared with said rod.

25. The fusing apparatus of claim 23, wherein said rod has a U-shaped profile.

26. A method for forming a fused joint between an armature wire having electrical insulation thereon positioned against one surface of a terminal extending from a commutator bar, said method comprising moving a single fusing electrode constructed from a material having a high electrical resistance against said terminal proximately overlying a portion of said wire, and supplying electrical current solely through said electrode to heat said electrode to a temperature sufficient to remove said electrical insulation from said wire in contact with said terminal and to fuse said wire thereto without the passage of said electrical current through said terminal.

27. The method of claim 26, further including supporting said electrode from a pair of spaced supports having an electrical resistance lower than said electrode.

28. The method of claim 27, wherein said electrode comprises a cylindrical rod attached at its ends to said pair of space supports.

29. The method of claim 26, wherein said electrode has a portion engaging said terminal constructed to have an electrical resistance higher than the electrical resistance of the remainder of said electrode.

* * * * *

UNITED STATES PATENT AND TRADEMARK OFFICE
CERTIFICATE OF CORRECTION

PATENT NO. : 5,264,674

DATED : November 23, 1993

INVENTOR(S) : John P. Mangan and Edward D. Riordan

It is certified that error appears in the above-identified patent and that said Letters Patent is hereby corrected as shown below:

Column 6, line 58, after "116" insert --.--.

Column 7, line 60, after "techniques" insert --.--.

Column 8, line 52, after "102" insert --.--.

Column 10, line 1, after "claim" insert --1--.

Signed and Sealed this

Seventeenth Day of May, 1994

Attest:

BRUCE LEHMAN

Attesting Officer

Commissioner of Patents and Trademarks